United States Patent [19]

Agouri et al.

[11] 3,887,650

[45] June 3, 1975

[54] PROCESS FOR PREPARING BLOCK COPOLYMERS OF OLEFINS AND VINYLIC MONOMERS

[75] Inventors: Elias Agouri; Robert Laputte; Yves Philardeau; Jacques Rideau, all of Pau, France

[73] Assignee: Aquitaine Total Organico, Courbevoie, France

[22] Filed: Aug. 1, 1973

[21] Appl. No.: 384,586

[30] Foreign Application Priority Data
Aug. 4, 1972 France .............................. 72.28205

[52] U.S. Cl. ......... 260/878 B; 260/88.2 S; 260/93.7; 260/94.9 GC; 260/879; 260/880 B
[51] Int. Cl. .......................... C08f 15/00; C08f 27/22
[58] Field of Search ............ 260/878 B, 879, 880 B, 260/94.9 GC, 88.2 S, 93.7

[56] References Cited
UNITED STATES PATENTS

| | | | |
|---|---|---|---|
| 3,458,598 | 7/1969 | Craven | 260/878 B |
| 3,652,724 | 3/1972 | Shimomura et al. | 260/878 B |
| 3,699,190 | 10/1972 | Shimomura | 260/878 B |
| 3,734,978 | 5/1973 | Schwab | 260/878 B |
| 3,739,042 | 6/1973 | Chu et al. | 260/878 B |
| 3,769,368 | 10/1973 | Peyrot | 260/878 B |

*Primary Examiner*—Joseph L. Schofer
*Assistant Examiner*—A. Holler
*Attorney, Agent, or Firm*—Norman S. Blodgett; Gerry A. Blodgett

[57] ABSTRACT

A process for synthesizing block copolymers of olefins, in particular ethylene or propylene, and vinylic monomers.

The process consists of modifying an olefinic polymer or copolymer with terminal double bonds, using a compound of an element selected from boron and metals in columns II, III, IVA and VA of the periodic table of elements, in which at least one of the valencies of this element is saturated by a hydrogen atom, or a monovalent hydrocarbyl or hydrocarbyloxy radical, after which the modified polymer thus obtained is placed in contact with an oxygenated free-radical-producing initiator and one or more vinylic monomers, and polymerization of the monomer or monomers is left to take place.

42 Claims, No Drawings

PROCESS FOR PREPARING BLOCK COPOLYMERS OF OLEFINS AND VINYLIC MONOMERS

This invention concerns a process for preparing block copolymers, and more specifically the synthesis of block copolymers of olefins and vinylic monomers.

One recently proposed method of synthesizing block copolymers consists of polymerizing a monomer which can be polymerized anionically, such as an olefin, di-olefin or arylvinylic monomer, in the presence of a catalyst containing an organometallic compound of a metal in columns I, II or III of the periodic table of elements, and a derivative of a transition metal and an additive consisting of a compound of boron or of a metal in column IIB of the table of elements. A monomer which can be polymerized by a radical-type process and a suitable free-radical-producing catalyst, such as oxygen or peroxide, are then added to the polymer thus formed, without deactivating it, and radical-type polymerization of the monomer is left to take place.

This process can be used to obtain a wide variety of block copolymers of olefins and vinylic monomers, in which the amount of the sequence derived from the vinylic monomer can vary widely. However, the process involves two successive polymerizations, the first a Ziegler polymerization which, as is known to those skilled in the art, requires very precise control of operating conditions.

The present invention offers a process for synthesizing block copolymers of olefins and vinylic monomers, in which a polymer already formed provides the polyolefinic sequence of the block copolymer, so that there is no further need for the Ziegler polymerization stage required in the process described above, in order to synthesize this sequence.

The process described in this invention is characterized by the fact that an olefinic polymer or copolymer with terminal double bonds is modified by reaction with a compound of an element selected from boron and the metals in columns II, III, IVA and VA of the periodic table of elements, in which at least one of the valencies of the element is saturated by a hydrogen atom or monovalent hydrocarbyl or hydrocarbyloxy radical, that the modified polymer thus obtained is placed in contact with an oxygenated free-radical-producing initiator and one or more vinylic monomers, and that polymerization of the monomer or monomers is allowed to take place in the resulting mixture.

Olefinic polymers and copolymers with terminal double bonds suitable for use in this process include, in particular, polymers or copolymers of alpha-olefins containing from 2 to 18, and preferably 2 to 12, carbon atoms, notably polyethylene, polypropylene, 1-polybutene, poly 4-methyl 1-pentene, ethylene and propylene or ethylene and 1-butene copolymers. These polymers or copolymers with terminal double bonds can be obtained by polymerizing olefins, using either chrome-oxide-based catalysts on a silica and alumina carrier, as in the case of the Phillips process, or ethylenically unsaturated chain transfer agents such as 1-butene, propylene, 1-hexene, and dienes. These polymers or copolymers can also be obtained by controlled disproportionation, particularly by controlled thermal degradation in a vacuum, of the corresponding saturated polymers or copolymers. Controlled disproportionation can also be used to increase the proportion of terminal double bonds in olefinic polymers or copolymers already containing such terminal double bonds, as obtained by direct polymerization of olefins.

Compounds used to modify olefinic polymers or copolymers with terminal double bonds include derivatives with the formula $M(H)_y(X)_x(R)_{(n-(x+y))}$, where M represents one of the elements boron, aluminium, germanium, tin, lead, antimony, magnesium, zinc and cadmium, X is a halogen, particularly chlorine or bromine, and R represents identical or different alkyl, aryl, cycloalkyl, alkylaryl, aralkyl and alcoxy radicals containing from 1 to 12, and particularly 1 to 9, carbon atoms, $n$ represents the valency of M, and $y$ and $x$ represent whole numbers varying from 0 to $n$ for $y$, and 0 to $(n-1)$ for $x$, the sum $(x+y)$ being not more than $n$.

These compounds include, among others, diborane, triborane, tetraborane, dichlorophenylborane, dibromobutylborane, dihydrophenylborane, diethoxylated monoborane, bis (3-methyl-2-butyl) borane, 9-bora bicyclo (3,3,1) nonane, trimethylboron, triethylboron, trihexylboron, triphenylboron, aluminium trihydride, dimethyl aluminium hydride, diethyl aluminium hydride, di-isobutyl aluminium hydride, dioctyl aluminium hydride, diphenyl aluminium hydride, chloroalane, triethyl aluminium, tri-isobutyl aluminium, trihexyl aluminium, diethyl aluminium chloride, dipropyl aluminium chloride, dimethyl aluminium chloride, diethyl aluminium bromide, monogermane, digermane, trigermane, tetragermane, monochlorogermane, dichlorogermane, monobromogermane, dibromogermane, diethylmonochlorogermane, (n-butyl) monochlorogermane, monoethylgermane, monobutylgermane, monooctylgermane, dipropylgermane, diphenylgermane, tributylgermane, tetraethylgermane, tetrabutylgermane, stibine, trimethylstibine, triethylstibine, triisoamylstibine, phenylstibine, tolystibine, chlorodimethylstibine, lead-tetraethyl, stannane, triethylstannane, trimethylstannane, triphenylstannane, tetramethylstannane, dimethylstannane, magnesium hydride, diphenylmagnesium, diethylmagnesium, ethylmagnesium chloride, phenylmagnesium bromide, ethylzinc chloride, ethylzinc bromide, propylzinc chloride, butylzinc chloride, ethylcadmium chloride, diethylzinc, and diethyl cadmium.

The quantity of compound used to modify the olefinic polymer with terminal double bonds, in other words fixing itself to such double bonds, is such that the ratio of the number of molecules of the compound to the number of terminal double bonds in the polymer is between 0.01 and 40, and preferably between 0.3 and 10.

Reaction between the compound and the olefinic polymer takes place in an inert liquid, in which the polymer is dissolved or suspended. It can be any liquid that will not react with the modifying compound or the polymer, for example an aliphatic, cycloaliphatic or aromatic hydrocarbon such as cyclohexane, hexane, heptane, benzene, toluene, or ether, dioxane, tetrahydrofurane or diglyme.

Depending on whether the compound reacting with the olefinic polymer with terminal double bonds is affected by oxygen or not, the modifying reaction is carried out in an inert atmosphere to prevent the presence of oxygen, or in ordinary atmosphere without any special precautions.

The temperature at which the modification reaction takes place can be between −30° and 200°C, and is preferably between −20° and 120°C.

The duration of the reaction is not particularly important, and can vary from 20 or 30 minutes to several hours. Between 20 minutes and 6 hours are usually enough to produce the required results.

Oxygenated free-radical-producing initiators used to start off polymerization of the vinylic monomer or monomers in the presence of the modified olefinic polymer include peroxides such as benzoyl or lauroyl peroxide, hydroperoxides such as cumene hydroperoxide or paramenthane hydroperoxide, peracids, peresters, persalts, notably persulphates, hydrogen peroxide, oxygen, air, and ozone, among others.

The quantity of the initiator required may be such that the number of oxidant equivalents it supplies is at least equal to the number of moles of modifying compound fixed to the terminal double bonds of the olefin polymer, and it is preferable to use a surplus amount of initiator. Usually, the molar quantity of initiator is approximately the same as the molar quantity of modifying agent reacting with the olefinic polymer.

Vinylic monomers include monomers that can be polymerized or copolymerized by a reaction producing free radicals, and in particular acrylic, methacrylic and alpha-chloracrylic acids, acrylates and methacrylates of alkyls or substituted alkyls such as methyl acrylate, ethyl acrylate, buutyl acrylate, methyl methacrylate, dimethylaminoethyl methacrylate, acrylic amides, notably acrylamide and methacrylamide, acrylic nitriles, notably acrylonitrile and methacrylonitrile, vinylic esters such as vinyl acetate, vinyl propionate and vinyl butyrate, chlorovinylic derivatives such as vinyl chloride or vinylidene chloride, styrenic derivatives such as styrene, methylstyrene and chlorostyrene, vinylic ethers and thioethers, vinylic alcohol, vinylcarbazoles, vinylpyridines, vinylpyrrolidones, vinylsilanes, dienes such as butadiene, isoprene, piperylene, butadiene monoepoxide, and similar monomers.

The vinylic monomer can be polymerized in the presence of the modified olefinic polymer and oxygenated free-radical-producing initiator by adding the initiator and vinylic monomer directly to the reaction mixture resulting from the reaction between the olefinic polymer with terminal double bonds and the modifier compound, and allowing polymerization to take place in the mixture.

The modified olefinic polymer can also be separated first from the reaction mixture, for instance by filtration or centrifugalization, and the modified polymer is then placed in contact with the oxygenated free-radical-producing initiator and vinylic monomer in an inert liquid phase, or using the vinylic monomer as a suspension medium. The inert liquid phase used is generally of the same type as that used for the reaction to modify the olefinic polymer with terminal double bonds, but polymerization can be done in an aqueous phase, where the modified olefinic polymer is not affected by water, or when it has already been placed in contact with the initiator.

Polymerization temperature can vary widely, for instance from −78° to +180°C, preferably being below the temperature at which the free-radical-producing initiator undergoes thermal decomposition. For most vinylic monomers, a temperature of between −40° and +100°C ensures satisfactory results.

The duration of polymerization is of no critical importance, and can vary widely. Preferably, it should be selected for each type of vinylic monomer, to ensure optimum conversion.

The reaction between the olefinic polymer with terminal double bonds and the modifying agent can take place in the presence of complexing agents of the Lewis base type, such as ethers, sulphoxides and amines like trimethylethylenediamine.

Similarly, complexing agents in the group of weak Lewis acids, such as ethyl acetate, can be added to the vinylic monomer polymerization mixture, preferably after the initiator has been added to the mixture, but before the vinylic monomer or monomers have been added.

When the vinylic monomer has been polymerized, the block copolymer is separated from the polymerization mixture, for instance by filtration or precipitation in a non-solvent, and it then undergoes extraction treatment with suitable solvents, to remove the homopolymers it contains.

The invention is illustrated by the following examples, without being in any way confined to them.

EXAMPLE 1

Three control tests, A, B and C, were carried out as follows.

Test A : 20 g of high-density polythene powder, containing practically no terminal double bonds, were placed in suspension in 500 ml of anhydrous heptane, in a 1-litre reactor, and nitrogen was bubbled through the suspension, while it was heated to 80°C. 9 millimoles of di-isobutyl aluminium hydride were then added to the hot suspension, and contact was maintained for 2 hours at 80°C in an inert atmosphere. The suspension was then cooled to 40°C, and 9 millimoles of lauroyl peroxide and 40 g of methyl methacrylate were added, after which the mixture was kept at a temperature of 40°C for three hours. The contents of the reactor were then poured into a methanol-HCl mixture, and the precipitate that formed was separated by filtration, washed several times in methanol and dried, after which the dried copolymer was treated with acetone to extract the polymethylmethacrylate.

An infra-red spectrographic analysis of the purified copolymer showed that the fixed methacrylate content was 0.3% of the weight of copolymer.

Test B : Test A was repeated with a high-density polythene containing 1.6 terminal double bonds per thousand carbon atoms, and without using peroxide during the methyl methacrylate polymerization phase.

Infra-red analysis of the copolymer obtained showed that it contained only 0.1 terminal double bonds, but that the content of fixed methyl methacrylate in the polythene was only 0.4% of the weight of copolymer.

Test C : 20 g of polythene powder, the same as that used in test B, was placed in suspension in 500 ml of heptane, in a 1-litre reactor similar to the one used in the earlier tests. Nitrogen was then bubbled through the suspension while it was heated to 40°C, after which 9 millimoles of lauroyl peroxide and 40 g of methyl methacrylate were added to it. The reaction mixture thus obtained was kept at 40°C for three hours in a inert atmosphere. The contents of the reactor were then poured into a methanol-HCl mixture, and the copolymer was separated out and purified as described in test A.

Infra-red analysis of the copolymers showed that the content of fixed methyl methacrylate and polythene was 0.6% of its weight.

EXAMPLE 2

A series of tests were carried out to prepare polythene/methyl polymethacrylate block co-polymers, using a similar process to the one described in test A of example 1, but using a polythene containing 1.6 terminal double bonds per 1,000 carbon atoms.

The quantities of polythene and methyl methacrylate, together with specific operating conditions and the results obtained for the various tests, are given in table 1.

weight for those in control tests A, B and C in example 1, to between 6.8 and 14.7% for those corresponding to tests 1 to 14.

EXAMPLE 3

A series of block copolymers of ethylene and various vinylic monomers were prepared, using the same process as in test 1 in example 2, with only the type of the vinylic monomer changing.

Table 2 below shows the copolymer content obtained in the sequence derived from the vinylic monomer for each type of monomer, as shown by infra-red analysis.

Table 1

| Test n° | 1 | 2* | 3 | 4 | 5 | 6 | 7 |
|---|---|---|---|---|---|---|---|
| Quantity of polythene (g) | 100 | 100 | 100 | 100 | 100 | 100 | 100 |
| HAL (iso—$C_4H_9$)$_2$ (millimoles) | 45 | 45 | 45 | 45 | 30 | 15 | 45 |
| Alumination temperature (°C) | 80 | 80 | 80 | 80 | 80 | 80 | 80 |
| Length of alumination (hours) | 2 | 2 | 2 | 0.5 | 2 | 2 | 2 |
| Methyl methacrylate (g) | 100 | 100 | 100 | 100 | 100 | 100 | 100 |
| Peroxide (millimoles) | 45 | 45 | 45 | 45 | 45 | 45 | 60 |
| Polymerization temperature (°C) | 40 | 40 | 40 | 40 | 40 | 40 | 40 |
| Length of polymerization (hours) | 3 | 3 | 3 | 3 | 3 | 3 | 3 |
| Residual double bonds in the copolymer (per 1,000 carbon atoms) | 0.04 | 0.14 | 0 | 0.3 | 0.3 | 0.1 | 0.3 |
| Fixed methacrylate in the copolymer (% weight) | 11.6 | 11 | 11.3 | 12 | 14.1 | 9.5 | 9.5 |

| Test n° | 8* | 9 | 10 | 11 | 12 | 13** | 14 |
|---|---|---|---|---|---|---|---|
| Quantity of polythene | 100 | 100 | 100 | 100 | 100 | 100 | 20 |
| HAL (iso—$C_4H_9$)$_2$ (millimoles) | 45 | 45 | 45 | 45 | 45 | 45 | 9 |
| Alumination temperature (°C) | 60 | 80 | 80 | 80 | 80 | 80 | 80 |
| Length of alumination (hours) | 2 | 2 | 2 | 2 | 2 | 2 | 2 |
| Methyl methacrylate (g) | 100 | 100 | 200 | 100 | 100 | 100 | 40 |
| Peroxide (millimoles) | 45 | 45 | 45 | 45 | 45 | 45 | 9 |
| Polymerization temperature (°C) | 40 | 40 | 40 | 20 | 20 | 40 | 50 |
| Length of polymerization (hours) | 3 | 3 | 3 | 3 | 15 | 3 | 3 |
| Residual double bonds in the copolymer (per 1,000 carbon atoms) | 0.6 | 0 | 0.3 | 0.2 | 0.3 | 0.1 | 0.36 |
| Fixed methacrylate in the copolymer (% weight) | 7 | 13.9 | 14.7 | 9.7 | 10.6 | 6.8 | 9.6 |

*The polythene with aluminated end groups was separated from the alumination reaction mixture, and placed in suspension in fresh heptane, before the peroxide and methacrylate were added.
**The peroxide used was cumene hydroperoxide.

Comparison of the results in this table with those for the control tests in example 1 show that the proportion of fixed methyl methacrylate in the polythene was increased considerably by using the method proposed in the invention, namely starting with a polythene with terminal double bonds, treating this polythene with a modifier compound according to the invention (here di-isobutyl aluminium hydride), and polymerizing the methyl methacrylate in the presence of the modified polymer and an oxygenated free-radical-producing initiator (here lauroyl peroxide or cumene hydroperoxide).

The proportion of sequence derived from the methacrylate in the block copolymer rose from 0.3–0.6% in Table 2

| Type of vinylic monomer | Fixed vinylic monomer in the copolymer (percentage weight) |
|---|---|
| Acrylonitrile | 24.8 |
| Styrene and acrylonitrile mixture* | 28.3** |
| 4-vinylpyridine*** | 11 |
| Hexyl methacrylate | 8.7 |
| Dimethylaminoethyl methacrylate | 11 |

*The mixture contained 24 % weight of acrylonitrile
**Consisting of 8 % acrylonitrile and 20.3 % styrene
***The aluminated polythene was separated from the alumination reaction mixture and placed again in suspension in fresh heptane, before the peroxide and 4-vinylpyridine were added.

EXAMPLE 4

Test 1 in example 2 was repeated, except that the polythene was replaced by the same amount of polypropylene containing 12 terminal double bonds per 1,000 carbon atoms, obtained by controlled thermal degradation of a polypropylene containing almost no double bonds and with a molecular mass of approximately 150,000.

The polypropylene/methyl polymethacrylate block copolymer obtained contained 12.4% weight of the sequence derived from methyl methacrylate.

EXAMPLE 5

Test 1 in example 2 was repeated, with the polythene replaced by the same amount of an ethylene and 1-butene copolymer obtained by the Phillips process, containing 0.9 terminal double bonds per 1,000 carbon atoms.

The poly (ethylene 1-butene)/polymethylmethacrylate block copolymer that was obtained contained 7.2% weight of the sequence derived from the methyl methacrylate.

EXAMPLE 6

Synthesis of two polythene/methyl polymethacrylate block copolymers was carried out using the procedure for test 2 in example 2, but with the diisobutylaluminium hydride replaced by the same molar proportion of diethylaluminium hydride, and then triisobutylaluminium hydride.

The resulting block copolymers contained 16.3% and 12.1% weight respectively of fixed polymethylmethacrylate sequence in the polythene.

EXAMPLE 7

Test 2 in example 2 was repeated, with the methyl methacrylate polymerized in the presence of 30 millimoles of ethyl acetate, added to the modified polymer suspension in fresh heptane after addition of the peroxide, but before the methyl methacrylate was added.

The resulting block copolymer contained 19.5% weight of fixed methacrylic sequence in the polythene.

EXAMPLE 8

One hundred grams of a commercial polythene powder containing 1.5 terminal double bonds per 1,000 carbon atoms were placed in suspension in 300 ml of tetrahydrofurane, in a 1-litre reactor. A boron compound was then added as polythene-modifying agent, and the reaction mixture was kept at a suitable temperature for 2 hours, while being stirred.

The modified polythene was separated from the boration reaction mixture, washed in heptane and placed in suspension again, either in fresh heptane, to which the initiator and vinylic monomer were then added (procedure H), or in the actual vinylic monomer, to which the initiator was then added (procedure V). The resulting mixture was kept at a suitable temperature for 5 hours.

Depending on the test, the vinylic monomer used was vinyl chloride, methyl methacrylate or vinyl acetate, the quantity being 100 g for procedure H and 300 g for procedure V.

The resulting block copolymer was filtered, washed in heptane and then methanol, treated in a Soxhlet apparatus with a suitable solvent, to extract the vinylic homopolymer, and dried.

The specific operating conditions and the results obtained for these different tests are given in table 3.

Table 3

| Number of test | 1* | 2 | 3 |
|---|---|---|---|
| Type of boration agent | Diborane | 9-Bora bicyclo (3,3,1)-nonane | 9-Bora bicyclo (3,3,1)-nonane |
| Proportion of boration agent (millimoles) | 5 | 10 | 10 |
| Boration temperature (°C) | 25 | 50 | 50 |
| Preparation of mixture for polymerization | Procedure H | Procedure H | Procedure V |
| Type of vinylic monomer | Methyl methacrylate | Methyl methacrylate | Vinyl chloride |
| Initiator used | Cumene hydroperoxide | Cumene hydroperoxide | Cumene hydroperoxide |
| Proportion of initiator (millimoles) | 5 | 5 | 5 |
| Polymerization temperature (°C) | 30 | 30 | −20 |
| Proportion of vinylic sequence in the block copolymer (% weight) | 9 | 12 | 6 |

Table 3—Continued

| Number of test | 4 | 5 | 6 | 7** |
|---|---|---|---|---|
| Type of boration agent | 9-Bora bicyclo (3,3,1)- nonane | Bis (methyl-3 butyl-2) borane | Bis (methyl-3 butyl-2) borane | 9-Bora bicyclo (3,3,1) nonane |
| Proportion of boration agent (millimoles) | 10 | 10 | 10 | 10 |
| Boration temperature (°C) | 50 | 20 | 20 | 50 |
| Preparation of mixture for polymerization | Procedure V | Procedure H | Procedure V | Procedure V |
| Type of vinylic monomer | Vinyl chloride | Vinyl acetate | Vinyl chloride | Vinyl chloride |
| Initiator used | Oxygen | $H_2O_2$ | $H_2O_2$ | Cumene hydro- peroxide |
| Proportion of initiator (millimoles) | 5 | 8 | 8 | 5 |
| Polymerization temperature (°C) | 0 | 30 | −20 | −20 |
| Proportion of vinylic sequence in the block copolymer (% weight) | 16 | 6 | 7 | 11 |

*When the polythene used in test 1 was replaced by a polythene containing almost no terminal bonds, the methacrylate content of the resulting copolymer was only 0.8 % weight.
**The polythene used in this test contained 1.6 terminal double bonds per 1,000 carbon atoms.

EXAMPLE 9

One hundred grams of a polyethylene powder containing 1.5 terminal double bonds per 1,000 carbon atoms were placed in suspension in 200 ml of tetrahydrofurane, in a 1-litre reactor. 20 millimoles of 9-bora bicyclo (3,3,1) nonane were added to this suspension, and the reaction mixture was kept at 50°C for 2 hours, while being stirred.

The temperature of the mixture was then lowered to 30°C, 10 millimoles of cumene hydroperoxide and 100 g of methyl methacrylate were added, and the new mixture kept at 30°C for 3 hours, while being stirred.

The resulting copolymer was filtered, washed in methanol, treated with acetone in a Soxhlet apparatus, to extract the homopolymethacrylate, and then dried.

The proportion of fixed methacrylate sequence in the copolymer was 8.5% weight.

EXAMPLE 10

One hundred grams of a polythene powder containing 1.6 terminal double bonds per 1,000 carbon atoms were placed in suspension in 300 ml of heptane in a 1-litre reactor. 20 millimoles of modifying agent were then added to the suspension and the mixture was kept at 50°C for 2 hours, while being stirred.

The temperature of the mixture was then lowered to 40°C, and 10 millimoles of cumene hydroperoxide and 100 g of vinylic monomer were added, and the resulting mixture kept at 40°C for 4 hours, while being stirred.

The resulting copolymer was filtered, washed in methanol, treated in a Soxhlet apparatus with a suitable solvent, to extract the homopolymer, and then dried.

The particular operating conditions and results obtained for the various tests are shown in table 4.

EXAMPLE 11

One hundred grams of a commercial polythene powder containing 1.5 terminal double bonds per 1,000 carbon atoms were placed in suspension in 300 ml of tetrahydrofurane, in a 1-litre reactor. 10 millimoles of bora-9-bicyclo (3,3,1) nonane were then added Table 4

| Modifying agent | Vinylic monomer | Fixed vinylic sequence in the copolymer (% weight) |
|---|---|---|
| Diethylzinc | Styrene | 10 |
| Monogermane | Methyl methacrylate | 12 |
| Tributylgermane | Methyl methacrylate | 10.5 | to the suspension, and the mixture kept at 50°C for 2 hours, while being stirred.

The modified polythene was then separated from the boration mixture, washed in heptane and placed in suspension again in fresh heptane. Air was fed into this suspension at a pressure of 5 bars for 3 hours, at atmospheric temperature.

The peroxidized polymer was placed in suspension again in water, with 50 g of styrene, and heated to 100°C for 4 hours.

When the homopolystyrene had been filtered out, infra-red analysis of the polythene/polystyrene block copolymer showed a polystyrene content equal to 15% of the weight of copolymer.

According to one feature of the present invention, it is possible not to go as far as the block copolymer stage, but simply to obtain a polyolefin with peroxide endgroups.

For this, the olefinic polymer or copolymer, after teatment with the modifying agent, as described above, is placed in contact with the oxygenated free-readicalproducing initiator, which may be, as already stated, a peroxide, hydroperoxide, hydrogen peroxide, oxygen or air, without any vinylic monomer present, and the resulting peroxidized polymer is separated from the peroxidation reaction mixture.

The peroxidized free-radical-producing initiator may be added directly to the reaction mixture resulting from the reaction between the modifying agent and the olefinic polymer with terminal double bonds.

Another method is first to separate the modified olefinic polymer from the modification reaction mixture, by centrifugalization or filtration, for instance, and then place the modified polymer thus collected in contact with the oxygenated free-radical-producing initiator in an inert liquid phase. This phase is usually of the same type as that used for the reaction to modify the olefinic polymer with terminal double bonds, and may for instance be an aliphatic, aromatic or cycloaliphatic hydrocarbon such as hexane, heptane, benzene, toluene, or cyclohexane, or ether, dioxane, or tetrahydrofurane.

The peroxidation reaction may also be carried out in an aqueous phase, when the modified olefinic polymer is unaffected by water. Peroxidation temperature may vary widely, between −80° and +120°C, for instance, and preferably betwen −40° and +80°C.

In one recommended embodiment, the peroxidized polyolefin resulting from the reaction between the oxygenated free-radical-producing initiator and the polyolefin treated with the modifying agent is subjected to hydrolysis in a polar medium, to obtain a polyolefin with hydroperoxide end groups. Hydrolysis can be done in a neutral or slightly acid aqueous phase, possibly in the presence of an emulsifying agent, at a temperature of between 0° and 100°C, and preferably between 2° and 60°C.

The peroxidized or hydroperoxidized polyolefin is separated from the liquid medium in which it is dissolved or in suspension, using any suitable method. When peroxidation has been performed in a solution, the peroxidized polymer may be precipitated, either by pouring this solution into an inert liquid that will not dissolve the peroxidized polymer, or by evaporating the solvent by distillation. The peroxidized polyolefin resulting from peroxidation in a suspension, or hydroperoxidized polyolefin, can be separated from the peroxidation or hydrolysis medium by simple filtration.

These polyolefins with peroxide end-groups are stable at temperatures that are not excessively high, and can be kept without difficulty at close to atmospheric temperature or lower, without special precautions.

They can be used, in particular, as cross-linkage agents for the corresponding polyolefins or other polyolefins or polydiolefins. They can also be used mixed with nonperoxidized polyolefins, to improve the adherence of such polyolefins on various substrates.

Naturally, polymerization of vinylic monomers using these polyolefins with peroxide end-groups as a free-radical-producing initiator produces block copolymers dereived from the oeflin and vinylic monomer. However, preliminary preparation of the polyolefin with peroxide end-groups, and particularly of the hydroperoxidized polyolefin, as described above, offers the advantage of allowing subsequent synthesis of block copolymers of the types described above, using an aqueous phase, and possibly a reducing agent to form a Redox system with the polyolefin with peroxide end-groups.

EXAMPLE 12

One hundred grams of a commercial polythene powder containing 1.5 terminal double bonds per 1,000 carbon atoms were placed in suspension in 300 ml of tetrahydrofurane, in a 1-litre reactor; 10 millimoles of 9-bora-bicyclo (3,3,1) nonane were then added to the suspension, and the mixture was kept at 50°C for 2 hours, while being stirred.

The modified polythene was next separated from the boration reaction mixture, washed in heptane and placed in suspension again in fresh heptane. Air was fed into this suspension at a pressure of 5 bars for 3 hours, at atmospheric temperature.

After separtaion from the peroxidation mixture, the polythene with peroxide end-groups was treated with 500 ml of ion-exchanged water, containing 0.2 g of lauryl sulphate. This process was carried out at atmospheric temperature for 2 hours, while the mixture was stirred at 750 rpm.

The polythene with hydroperoxide end-groups was then separated by filtration, collected in a nitrogen atmosphere, and dried.

The active oxygen contents of the polythene with peroxide end-groups, separated from the heptanic phase, and corresponding hydroperoxidized polythene, were 430 and 200 ppm respectively.

The active oxygen was found by measuring the peroxidic groups in the peroxidized polymer, using a method involving oxidation of potassium iodide or iodhydric acid with the peroxidized polymer, and then measurement of the released iodine by thiosulphate.

EXAMPLE 13

One hundred grams of commercial polythene powder containing 1.5 terminal double bonds per 100 carbon atoms were placed in suspension in 300 ml of tetrahydrofurane in a 1litre reactor; 5 millimoles of diborane were then added to the suspension, and the mixture was kept at 250°C for 2 hours, while being stirred.

The modified polythene was then separated from the boration reaction mixture, washed in heptane and placed again in suspension in fresh heptane. Air was then fed into this suspension at pressure of 5 bars for 3 hours at −30°C.

After separation from the peroxidation mixture, the polythene with peroxide end-groups was threated with 500 ml of ion-exchanged water containing 0.2 g of lauryl sulphate. This operation was carried out at a temperature of 5°C for 2 hours, while the mixture was stirred at 750 rpm.

The polymer with hydroperoxide end-groups was then separated by filtration, collected in a nitrogen atmosphere, and dried.

The active oxygen contents of the polythene with peroxide end-groups and corresponding hydroperoxidized polythene, measured in the way described in example 12, were 350 and 180 ppm respectively.

EXAMPLE 14

One hundred grams of commercial polythene powder containing 1.5 terminal double bonds per 1,000 carbon atoms were placed in suspension in 300 ml of tetrahydrofurane; 10 millimoles of bis (3-methyl 2-butyl) borane were then added to the suspension, and the mixture was kept at −10°C for 2 hours, while being stirred.

The resulting modified polythene was separated from the boration mixture, washed in heptane and placed in suspension in fresh heptane. Air was then fed into this suspension at a pressure of 5 bars for 3 hours, at atmospheric temperature.

After being separated from the peroxidation medium, the polythene with peroxide end-groups was treated with ion-exchanged water, and collected in the way described in example 13.

The active oxygen contents of the polythene with peroxide end-groups and corresponding hydroperoxidized polythene, measured in the way described in example 12, were 300 and 150 ppm respectively.

What is claimed is:

1. A process for synthesizing block copolymers of olefins and vinylic monomers, comprising the steps of modifying in the absence of Ziegler-type catalysts, an olefinic polymer or copolymer containing terminal double bonds by the reaction with a compound of an element selected from boron and the metals in Columns II, III, IVA and VA of the periodic table of elements, in which at least one of the valencies of the element is saturated by a hydrogen atom or monovalent hydrocarbyl or hydrocarbyloxy radical, placing the resulting modified polymer in contact with an oxygenated free-radical-producing initiator and at least one vinylic monomer, and allowing polymerization of the monomer or monomers to take place within the resulting mixture.

2. A process as defined in claim 1, in which the compound reacting with the olefinic polymer or copolymer with terminal double bonds has the general formula $M(H)_y(X)_x(R)_{n-(x+y)}$ where M represents one of the elements boron, aluminium, germanium, tin, lead, antimony, magnesium, zinc and cadmium, X is a hologen, and R represents identical or different alkyl, aryl, cycloalkyl, alkylaryl, aralkyl and alcoxy radicals containing from 1 to 12 carbon atoms, $n$ represents the valency of M, and $y$ and $x$ represent whole numbers, between 0 and $n$ for $y$ and between 0 and $(n-1)$ for $x$, the sum of $x+y$ being not more than $n$.

3. A process as defined in claim 2, in which the alkyl, aryl, cycloalkyl, alkylaryl, aralkyl and alcoxy radicals contain from 1 to 9 carbon atoms.

4. A process as defined in claim 1, in which the proportion of compound reacting with the olefinic polymer or copolymer is such that the relation of the number of molecules of the compound to the number of terminal double bonds in the copolymer or polymer is between 0.01 and 40.

5. A process as defined in claim 4, in which the ratio of the number of molecules in the compound to the number of terminal double bonds in the polymer or copolymer is between 0.3 and 10.

6. A process as defined in claim 1, in which the olefinic polymers or copolymers with terminal double bonds are derived from alpha-olefins containing from 2 to 18 carbon atoms.

7. A process as defined in claim 6, in which the olefinic polymers or copolymers with terminal double bonds are derived from alpha-olefins containing from 2 to 12 carbon atoms.

8. A process as defined in claim 1, in which modification of the olefinic polymer or copolymer takes place in an inert liquid.

9. A process as defined in claim 8, in which modification of the olefinic polymer or copolymer takes place in an inert atmosphere.

10. A process as defined in claim 1, in which modification of the olefinic polymer or copolymer takes place at a temperature of between −30° and 200°C.

11. A process as defined in claim 10, in which modification of the olefinic polymer or copolymer takes place at a temperature of between −20° and 120°C.

12. A process as defined in claim 1, in which modification of the olefinic polymer or copolymer is carried out in the presence of a complexing agent of the Lewis base type.

13. A process as defined in claim 1, in which the oxygenated free-radical-producing initiator belongs to the group comprising peroxides, hydroperoxides, hydrogen peroxide, oxygen and air.

14. A process as defined in claim 1, in which the initiator and vinylic monomer or monomers are added directly to the reaction mixture in which modification of the olefinic polymer takes place.

15. A process as defined in claim 1, in which the olefinic polymer treated with the modifying agent is separated from the modification reaction mixture before being brought into contact with the oxygenated free-radical-producing initiator and monomer or monomers.

16. A process as defined in claim 15, in which the modified polymer is brought into contact with the initiator and vinylic monomer or monomers for polymerization in an inert liquid phase, which may be an aqueous phase if the modified polymer is not affected by water or if the contact is made before the combination of the polymer, initiator and monomer or monomers is placed in the liquid phase.

17. A process as defined in claim 15, in which the modified polymer is brought into contact with the initiator and vinylic monomer or monomers for polymerization, using the monomer or monomers as a suspension medium.

18. A process as defined in claim 1, in which polymerization of the vinylic monomer or monomers in the presence of the modified olefinic polymer and initiator is carried out at a temperature of between −78° and +180°C.

19. A process as defined in claim 18, in which polymerization takes place at a temperature of between −40° and +100°C.

20. A process as defined in claim 18, in which polymerization takes place below the temperature of thermal decomposition of the initiator used.

21. A process as defined in claim 16, in which polymerization of the vinylic monomer or monomers is performed in the presence of a complexing agent of the weak Lewis acid type.

22. A process as defined in claim 21, in which polymerization is performed in the presence of ethyl acetate.

23. A process as defined in claim 1, in which the vinylic monomers belong to the group comprising chlorovinylic, acrylic, methacrylic, vinylaromatic, vinylpyridines, vinylpyrrolidones, butadiene, and vinyl esters.

24. A process for preparing olefinic polymers with peroxide end-groups, comprising the steps of modifying an olefinic polymer or copolymer containing terminal double bonds by reaction with the compound of an element selected from boron and metals in Columns II, III, IVA and VA of the periodic table of elements, in which at least one of the valencies of the element is saturated by a hydrogen atom or monovalent hydrocarbyl or hydrocarbyloxy radical, placing the resulting modified polymer in contact with an oxygenated free-radical-producing initiator, and collecting the peroxidized polymer that forms.

25. A process as defined in claim 24, in which the compound reacting with the olefinic polymer or copolymer with terminal double bonds has the general formula $M(H)_y(X)_x(R)_{n-(x+y)}$ germanium, tin, lead, antimony, magnesium, zinc and cadmium, X is a halogen, and R represents identical or different alkyl, aryl, cycloalkyl, alkylaryl, aralkyl and alcoxy radicals containing from 1 to 12 carbon atoms, $n$ represents the valency of M, and $y$ and $x$ represent whole numbers, between 0 and $n$ for $y$ and between 0 and $(n-1)$ for $x$, the sum of $x+y$ being not more than n.

26. A process as defined in claim 25, in which the alkyl, aryl, cycloarkyl, alkylaryl, aralkyl and alcoxy radicals contain from 1 to 9 atoms.

27. A process as defined in claim 24, in which the proportion of compound reacting with the olefinic polymer or copolymer is such that the relation of the number of molecules of the compound to the number of terminal double bonds in the polymer or copolymer is between 0.01 and 40.

28. A process as defined in claim 27, in which the ratio of the number of molecules in the compound to the number of terminal double bonds in the polymer or copolymer is between 0.3 and 10.

29. A process as defined in claim 24, in which the olefinic polymers or copolymers with terminal double bonds are derived from alpha-olefins containing from 2 to 18 carbon atoms.

30. A process as defined in claim 29, in which the olefinic polymers or copolymers with terminal double bonds are derived from alpha-olefins containing from 2 to 12 carbon atoms.

31. A process as defined in claim 24, in which modification of the olefinic polymer or copolymer takes place in an inert liquid..

32. A process as defined in claim 31, in which modification of the olefinic polymer or copolymer takes place in an inert atmosphere.

33. A process as defined in claim 24, in which modification of the olefinic polymer or copolymer takes place at a temperature of between −30° and 200°C.

34. A process as defined in claim 33, in which modification of the olefinic polymer or copolymer takes place at a temperature of between −20° and 120°C.

35. A process as defined in claim 24, in which modification of the olefinic polymer or copolymer is carried out in the presence of a complexing agent of the Lewis base type.

36. A process as defined in claim 24, in which the oxygenated free-radical-producing initiator belongs to the group comprising peroxides, hydroperoxides, hydrogen peroxide, oxygen and air.

37. A process as defined in claim 24, in which the initiator and vinylic monomer or monomers are added directly to the reaction mixture in which modification of the olefinic polymer takes place.

38. A process as defined in claim 24, in which the olefinic polymer treated with the modifying agent is separated from the modification reaction mixture before being brought into contact with the oxyginated free-radical-producing initiator.

39. A process as defined in claim 38, in which the modified polymer is brought into contact with the initiator in an inert liquid phase, which may be an aqueous phase when the modified polymer is not affected by water.

40. A process as defined in claim 24, in which the peroxidized polymer resulting from the peroxidation treatment by the oxygenated free-radical-producing initiator is then subjected to hydrolysis.

41. A process as defined in claim 40, in which hydrolysis is performed in an aqueous or slightly acid phase, at a temperature of 0° to 100°C.

42. A process as defined in claim 41, in which hydrolysis is performed at a temperature of 2° to 60°C.

* * * * *